(12) United States Patent
Shah

(10) Patent No.: US 7,523,504 B2
(45) Date of Patent: Apr. 21, 2009

(54) METHODS, SYSTEMS AND COMPUTER PROGRAM PRODUCTS FOR EVALUATING SECURITY OF A NETWORK ENVIRONMENT

(75) Inventor: Pinkesh Shah, Houston, TX (US)

(73) Assignee: NetIQ Corporation, San Jose, CA (US)

( * ) Notice: Subject to any disclaimer, the term of this patent is extended or adjusted under 35 U.S.C. 154(b) by 876 days.

(21) Appl. No.: 10/909,655

(22) Filed: Aug. 2, 2004

(65) Prior Publication Data
US 2006/0026688 A1    Feb. 2, 2006

(51) Int. Cl.
G06F 15/18    (2006.01)
G08B 23/00    (2006.01)
G06F 12/16    (2006.01)

(52) U.S. Cl. .......................... 726/25; 726/23
(58) Field of Classification Search ................... 726/23, 726/25
See application file for complete search history.

(56) References Cited

U.S. PATENT DOCUMENTS

| | | | | |
|---|---|---|---|---|
| 6,711,615 | B2* | 3/2004 | Porras et al. ................. | 709/224 |
| 6,742,128 | B1* | 5/2004 | Joiner ........................ | 726/25 |
| 7,185,368 | B2* | 2/2007 | Copeland, III ............... | 726/25 |
| 7,257,630 | B2* | 8/2007 | Cole et al. .................. | 709/224 |
| 2002/0066034 | A1* | 5/2002 | Schlossberg et al. ........ | 713/201 |
| 2002/0178275 | A1* | 11/2002 | Hein et al. .................. | 709/231 |
| 2003/0084349 | A1* | 5/2003 | Friedrichs et al. ........... | 713/201 |
| 2003/0212903 | A1* | 11/2003 | Porras et al. ................ | 713/200 |
| 2004/0044912 | A1* | 3/2004 | Connary et al. ............. | 713/201 |
| 2004/0098623 | A1* | 5/2004 | Scheidell .................... | 713/201 |
| 2004/0143753 | A1* | 7/2004 | Hernacki et al. ............ | 713/200 |
| 2004/0230834 | A1* | 11/2004 | McCallam .................. | 713/201 |
| 2006/0026688 | A1* | 2/2006 | Shah .......................... | 726/25 |

FOREIGN PATENT DOCUMENTS

WO    WO 03/083660    10/2003

OTHER PUBLICATIONS

Javitz, Harold S. et al. "The NIDES Statistical Component Description and Justification", Mar. 7, 1994.*
Manikopoulos, Constantine et al. "Network Intrusion and Fault Detection: A Statistical Anomaly Approach", 2002 IEEE.*
"ArcSight: TruThreat Risk Correlation Yields Precision Risk Management," © 2003 Future Com LT, http://www.myfuturecom.com/Products/ArcSight/TruThreatCorrelation.asp (Jan. 17, 2005).

(Continued)

Primary Examiner—Michael J Simitoski
(74) Attorney, Agent, or Firm—Myers Bigel Sibley & Sajovec

(57) ABSTRACT

Methods, systems and computer program products are provided for evaluating security of a network environment. Security data associated with an asset in the network environment collected over a first period of time is analyzed to detect security events occurring at a rate above a reference rate. Security data associated with the asset collected over a second period of time, greater than the first period of time, is analyzed to detect security events occurring at a rate below the reference rate. A threat index is generated based on the detected security events.

59 Claims, 7 Drawing Sheets

OTHER PUBLICATIONS

"CA Security Management: eTrust Network Forensics," © 2005 Computer Associates International, Inc., http://www3.ca.com/Solutions/Overview.asp?ID=4856&TYPE=S (Jan. 17, 2005).

"The Nessus Project: Introduction," © 1998-2004 Renaud Deraison, http://www.nessus.org/intro.html (Apr. 19, 2004).

"netForensics Product Info: Risk Assessment," © 2004 NETFORENSICS, Inc., http://www.netforensics.com/documents/pr_risk.asp (Apr. 19, 2004).

"netForensics Product Info: Security Information Management (SIM)," © 2004 NETFORENSICS, Inc., http://netforensics.com/documents/pr_sim.asp (Apr. 19, 2004).

"Symantec Security Response: Enterprise Security Manager," © 1995-2004 Symantec Corporation, http://securityresponse.symantec.com/avcenter/security/Content/Product/Product_ESM.html (Apr. 19, 2004).

"Vulnerability Management: Assess and Secure Multi-Platform Environments," © 1997-2004 BindView Corporation, http://www.bindview.com/Products/VulnMgmt/ (Apr. 19, 2004).

Invitation to Pay Additional Fees and Partial International Search Report for International patent application No. PCT/US2005/026245 mailed on Nov. 24, 2005.

* cited by examiner

METHODS, SYSTEMS AND COMPUTER PROGRAM PRODUCTS FOR EVALUATING SECURITY OF A NETWORK ENVIRONMENT

BACKGROUND OF THE INVENTION

The present invention relates to network communication methods, systems and computer program products and, more particularly, to methods, systems and computer program products for evaluating security of computer network environments.

With an increased reliance on Internet and extranet communications, companies may be forced to allow public or semi-public access to their internal systems and networks, rendering these systems and networks susceptible to security breaches and policy violations. Accordingly, companies may increase investments in both their information technology (IT) and information security infrastructures in an attempt to balance security with connectivity. However, this balance may generate high volumes of data, making it difficult to identify all of the system attacks and exploits that occur on a regular basis. As a result of increased security data and limited resources, security breach detection may become a challenge for companies of all sizes.

Many IT companies have developed security management solutions to address the current need for security breach detection. For example, ArcSight of Sunnyvale, Calif., netForensics of Edison, N.J., Computer Associates International, Inc. of Islandia, N.Y., Symantec, of Cupertino, Calif., BindView of Houston, Tex. and Nessus all provide Security Management Solutions. ArcSight, netForesensics and Computer Associates may provide security management solutions that depict ongoing threats, i.e. intrusion activities, in realtime with respect to an asset, i.e. a router, switch and the like. Symantec, BindView and Nessus provide solutions that may provide an indicator of vulnerabilities for a given asset, for example, misconfigurations of the asset, and policy compliance of the asset. NetIQ Corporation of San Jose, Calif. provides a security management suite that uses both the threats to a particular asset and the vulnerabilities of the asset to provide security breach protection to the asset.

SUMMARY OF THE INVENTION

Some embodiments of the present invention provide methods, systems and computer program products for evaluating security of a network environment. Security data associated with an asset in the network environment collected over a first period of time is analyzed to detect security events occurring at a rate above a reference rate. Security data associated with the asset collected over a second period of time, greater than the first period of time, is analyzed to detect security events occurring at a rate below the reference rate. A threat index is generated based on the detected security events.

In further embodiments of the present invention, the first period of time may be a most recent period of time. A baseline pattern may be established based on the analyzed security data associated with the asset collected over the first period of time and/or the second period of time. The detected security events may be detected based on security data that deviates from the baseline pattern. The baseline pattern may include a time sequence of events and the security data that deviates may include at least one event instance that is out of sequence with the time sequence of events.

In still further embodiments of the present invention, the detected security events may be detected based on security data that corresponds to the baseline pattern. The baseline pattern may correspond to a defined pattern that indicates non-compliance with a policy indicating a possible security breach. The detected security events may be respectively detected based on a single instance of security data.

In some embodiments of the present invention, the security data associated with an asset in the network environment collected over the first and second periods of time may be obtained. In certain embodiments, a notification of the threat index may be provided, for example, a chart visually indicating the generated threat index may be generated.

In further embodiments of the present invention, the threat index is generated by calculating an event index for the asset based on the security data associated with the asset collected over the second period of time and an alert index for the asset based on the security data associated with the asset collected over the first period of time. The event index and the alert index may be combined to provide the threat index. A weighting may be assigned to the event index and the alert index and the event index and the alert index may be combined based on the assigned weightings. In certain embodiments of the present invention, the weight assigned to the event index may be equal to the weight assigned to the alert index and the threat index may be generated by calculating a sum of the event index and the alert index and dividing the sum by 2.

In still further embodiments of the present invention, the event index is calculated using the following equation:

$$\text{Event Index} = i\Sigma(2^{i} * (\text{number of events with } i))/\text{total number of events},$$

where i is a severity index associated with the asset, where the number of events is a number of events associated with the asset having the severity index i during the second period of time and where the total number of events is a total number of events for the asset during the second period of time. The severity index i may be a low severity, a medium severity and/or a high severity and the second period of time may be at least thirty days.

In some embodiments of the present invention, the alert index may be calculated using the following equation:

$$\text{Alert Index} = i\Sigma(2^{i} * (\text{number of alerts}))/\text{total number of alerts},$$

where i is a severity index associated with the asset, where the number of alerts is the number of alerts for the asset having a severity index i during the first period of time and where the total number of alerts is a total number of alerts for all assets in the network during the first period of time. The severity index for the alert index may be a high severity and the first period of time may be no more than about the last six hours before the alert index is calculated.

In further embodiments of the present invention, a vulnerability index is generated for the asset based on obtained vulnerability data. An asset index may be assigned to the asset based on obtained relative importance level data and a security index may be generated for the asset based on the generated threat index, the generated vulnerability index and the assigned asset index.

In still further embodiments of the present invention, the vulnerability index may be calculated using the following equation:

$$\text{Vulnerability Index} = i\Sigma(2^{i} * (\text{number of failed checks}))/\text{total number of checks}$$

where i is a severity index associated with the asset, where the number of failed checks is the number of the failed checks associated with the asset having the severity index i during a third period of time and where the total number of checks is a total number of checks run on the asset during the third period of time. The severity index i may include a low severity, a medium severity and/or a high severity and the third period of time may be at least three full interrogations of the asset.

In some embodiments of the present invention, the security index for the asset is generated by calculating a product of the generated threat index, the generated vulnerability index and the assigned asset index. In certain embodiments, a threat index associated with a plurality of assets in the network environment may be generated. A vulnerability index associated with the plurality of assets in the network environment may be generated and an asset index associated with the plurality of assets in the network environment may be assigned. A security index may be generated for each of the plurality of assets in the network environment based on the threat index, the vulnerability index and the asset index associated with respective ones the plurality of assets.

In further embodiments of the present invention, an overall network security index is calculated based on the generated security indexes for each of the plurality of assets. The overall network security index may be calculated by obtaining an average of the generated security indexes for each of the plurality of assets in the network environment.

In still further embodiments of the present invention, a chart visually indicating the security index for ones of the plurality of assets may be generated. Security indexes associated with ones of the plurality of assets may each have a different associated visual indication and a size of the associated visual indication may indicate the security index of ones of the plurality of assets relative to the security index of other ones of the plurality of assets. The chart may include a visual indication of a historical trend of the security indexes for one or more of the plurality of assets. The historical trend may indicate an increase or decrease in a security index based on historical security data associated with associated ones of the plurality of assets.

In some embodiments of the present invention an asset index may be assigned by providing an initial asset index for the asset, identifying a change in context for the asset and automatically changing the asset index for the asset based on the identified change in context of the asset.

Further embodiments of the present invention provide methods, systems and computer program products for characterizing a security importance of an active (i. e., powered and connected) asset in a network environment. An initial security importance is provided for the active asset. A change in context is identified for the active asset and the security importance for the active asset is automatically changed based on the identified change in context of the active asset.

In still further embodiments of the present invention a change in context is identified by determining a category of data being processed by the active asset and identifying the change in context for the active asset based on the determined category of data being processed by the active asset. The change in context may be identified by determining an application executing on the active asset and identifying the change in context for the active asset based on the determined application executing on the active asset.

In further embodiments of the present invention, the active asset has an associated type. The change in context may be identified by determining a category of data being processed by the active asset, determining a category of data being processed by a different active asset of the same type, and identifying the change in context for the active asset based on a difference between the category of data being processed by the active asset and the category of data being processed by the different active asset of the same type.

While described above primarily with reference to methods, systems and computer program products are also provided.

DETAILED DESCRIPTION OF EMBODIMENTS OF THE INVENTION

Figure 1:
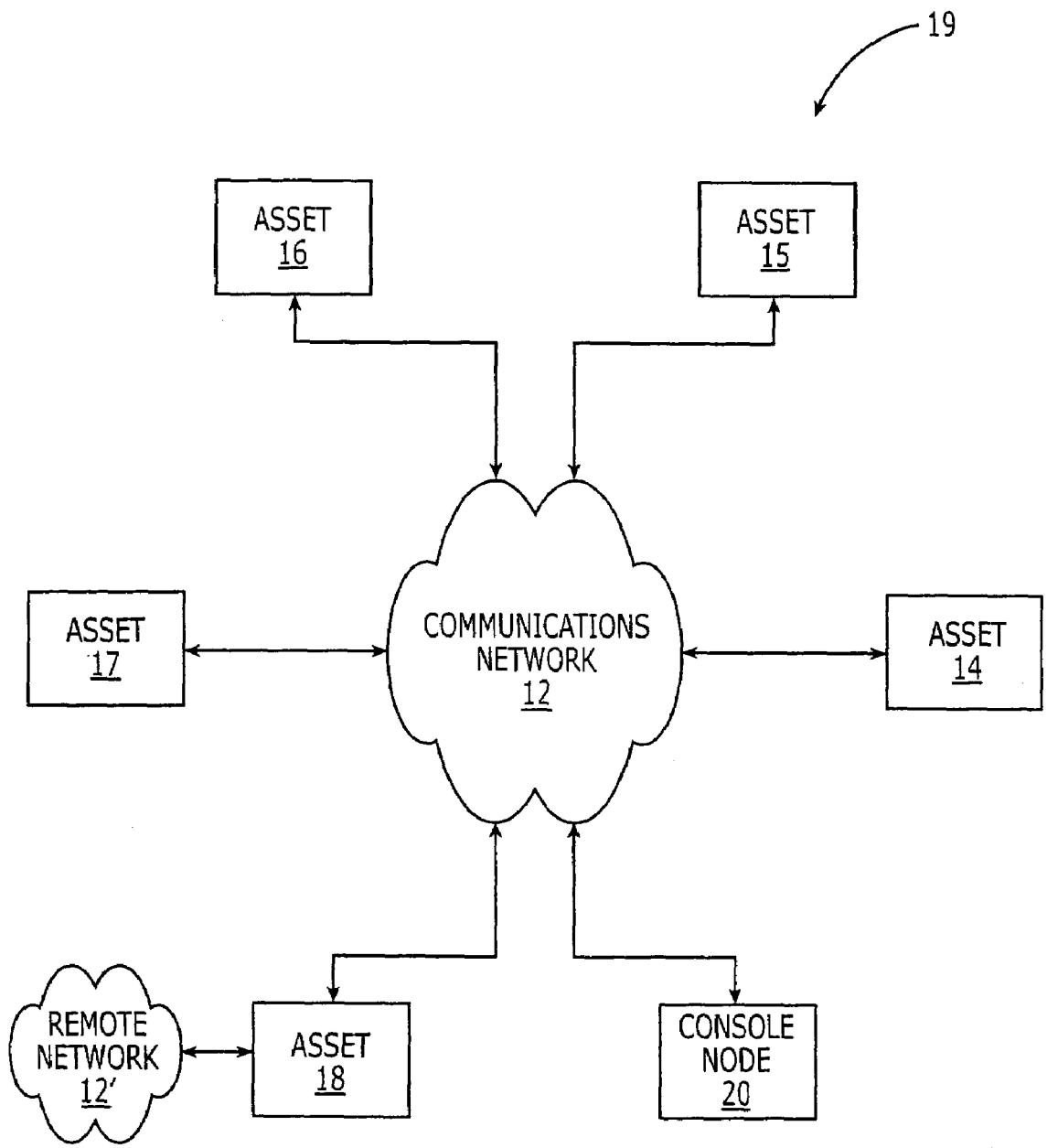
FIG. 1 is a block diagram illustrating a hardware and software environment including some embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention may be embodied as a mobile terminal, method or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including either computer readable storage mediums, such as hard disks, CD-ROMs, optical storage devices or magnetic storage devices, or a transmission media, such as those supporting the Internet or an intranet.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described in part below with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flow chart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flow chart and/or block diagram block or blocks.

Embodiments of the present invention will now be described with respect to FIGS. 1 through 8 below. Embodiments of the present invention provide methods, systems and computer program products for evaluating security of a network environment using one or more indexes that indicate a threat to a particular asset, for example, a terminal, a router, a switch or the like, in the network environment (threat index), vulnerabilities of the particular asset that may be exploited (vulnerability index) and/or a relative importance level of the asset (asset index). In some embodiments of the present invention, the threat index, the vulnerability index and the asset index may be combined to provide a security index for the asset that may indicate the security health of the asset. In certain embodiments, security indexes may be generated for one or more assets in the network environment, which may be combined to provide an overall security index for the network environment. Thus, according to some embodiments of the present invention, a quantitative indication of the security health of the overall network environment may be provided based on the security health of the individual assets that make up the network environment.

Referring to FIG. 1, embodiments of network environments including communications systems according to some embodiments of the present invention will now be described. More particularly, a hardware and software environment in which the present invention can operate will be described. The present invention includes methods, systems and computer program products for evaluating network security of a network environment 19. As illustrated, the network environment 19 includes a communications network 12, which may include various routers, switches and the like as will be discussed with respect to FIG. 2. The communications network 12 provides a communication link between a series of assets 14, 15, 16, 17, 18 in the network environment 19 and may further provide a communication link between the assets 14, 15, 16, 17, 18 and the console node 20.

As will be understood by those having skill in the art, a communications network 12 may include a plurality of separate linked physical communication networks, which, using a protocol such as the Internet protocol (IP), may appear to be a single seamless communications network to user application programs. For example, as illustrated in FIG. 1, the remote network 12' and the communications network 12 may both include a communication node at the asset 18. Accordingly, additional assets (not shown) on the remote network 12' may be made available for communications from the assets 14, 15, 16, 17. It is further to be understood that, while for illustration purposes in FIG. 1 the communications network 12 is shown as a single network, it may be comprised of a plurality of separate interconnected physical networks. The assets 14, 15, 16, 17, 18 may reside on a computer. As illustrated by the asset 18, a single asset may comprise multiple assets for use in multiple networks (12, 12'). For example, the asset 18 may include two assets therein, for example, two disk drives.

The console node 20, or other means for obtaining security data and generating indexes according to embodiments of the present invention, may also be an asset without departing from the scope of the present invention. As used herein "security data" refers to data related to security events associated with an asset, for example, failed logins or unauthorized access, vulnerabilities of the asset, for example, non-compliance with a network policy or misconfigurations, and the importance of the asset. In some embodiments of the present invention, the security data may be stored at the asset. As used herein, an "asset" refers to an endpoint node or terminal, a router, a bridge, a server, a printer, a storage device, an I/O device or the like. The console node 20 may poll/query the assets to obtain the security data associated with and stored at the assets as will be discussed further below. It will be understood that, although the security data is discussed herein as being stored at the asset, embodiments of the present invention are not limited to this configuration. For example, the security data may be stored at the console node 20 without departing from the scope of the present invention.

Figure 2:
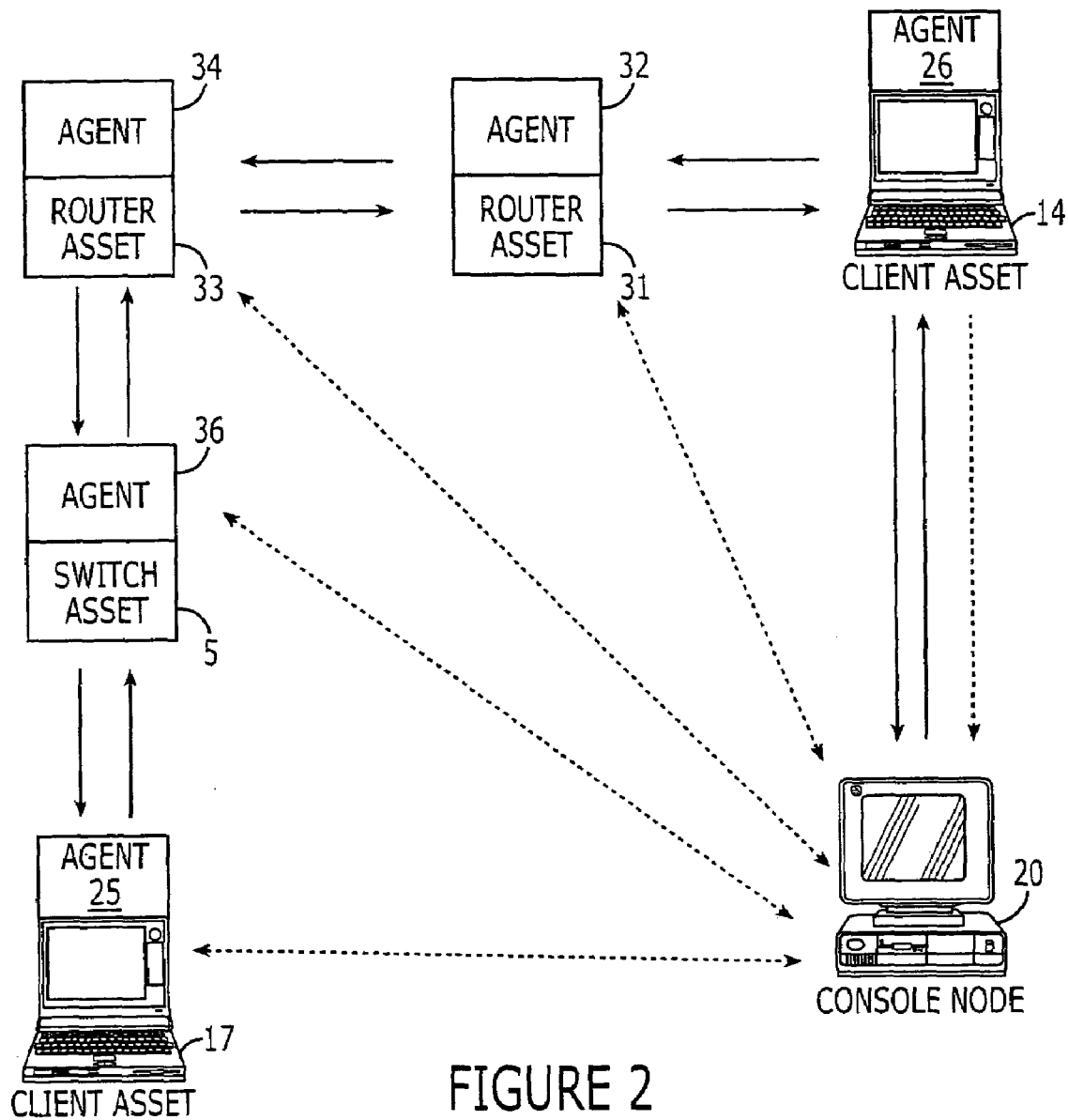
FIG. 2 is a more detailed block diagram of a hardware and software environment in which the present invention may operate according to some embodiments of the present invention.

Referring now to FIG. 2, a more detailed diagram of the network environment 19 including some embodiments of the present invention will be discussed. As illustrated in FIG. 2, the communications network 12 providing a communication link between endpoints 14, 15, 16, 17, 18 and console node 20 may include a plurality of router assets 31, 33, switch assets 35 and the like. An exemplary communication between the console node 20 and the client asset 17 will be discussed with respect to FIG. 2. The console node 20 may poll the client asset 17 for security data, for example, a number of failed login attempts at the client asset 17. This information may be stored at the client asset 17 and may be obtained using, for example, an agent 25 configured to obtain security data associated with the client asset 17. The security data may be, for example, used to calculate a threat index, a vulnerability index and/or assign an asset index associated with the client asset 17 according to some embodiments of the present invention.

A "threat index," as used herein, refers to an indicator of a threat level that an asset, for example, client asset 17, is subjected to. In other words, the threat index is a value that may be used to quantify the number of actual attacks, attempted attacks, security breaches and the like associated with the asset. In certain embodiments of the present invention, the threat index may be allocated a value of from 1 to 4 or other discrete range. The security data may include detected security events, which may be used to calculate the threat index. The detected security events may be obtained by one or more agents 25, 26, 32, 34, 36 configured to obtain security data associated with the asset and store the obtained security data at the asset. The detected security events may be, for example, one or more failed login attempts, a deviation from an established pattern, an unauthorized access and/or the like. In some embodiments of the present invention, the security data may be obtained using Security Manager provided by NetIQ Corporation of San Jose, Calif., the assignee of the present application.

The "vulnerability index," as used herein, refers to a quantitative representation of a current exposure state that exists for an asset. In certain embodiments of the present invention, the vulnerability index may be allocated a value of from 1 to 4 or other discrete range. The security data may include vulnerability data, for example, policy compliance data and misconfiguration data, for example, missing patches, which may be used to calculate the vulnerability index. The detected security events may be obtained by one or more agents 25, 26, 32, 34, 36 associated with the asset configured to obtain security data associated with the asset and/or store the obtained security data at the asset or elsewhere. For example, the vulnerability data may indicate that client asset 17 does not comply with 5 out of 20 policies dictated by the network environment. Thus, the client asset 17 may be more vulnerable to a security breach than an asset that complies with 20 out of 20 the policies, for example, the router asset 33. A policy may be, for example: after three unsuccessful login attempts do not allow the user attempting to login to attempt to login again until the user is verified. An asset that allows ten unsuccessful logins before requiring verification, i.e., an asset that does not comply with the policy, may be more vulnerable to a security breach than an asset that follows the policy and requires verification after three failed login attempts. In some embodiments of the present invention, the security data may be obtained using Vulnerability Manager provided by NetIQ Corporation of San Jose, Calif., the assignee of the present application.

The "asset index" or "security importance" as used herein, refers to the security importance of the asset relative to other assets in the network environment. For example, the router asset 31 may be more important than the switch asset 35 in the network environment 19 of FIG. 2. In certain embodiments of the present invention, the asset index may be allocated a value of from 1 to 4 or other discrete range. The security data may include relative importance data, which can be used to assign the asset index. The owner or operator of the network environment may select the asset index based on, for example, the role the asset has in the network environment or the business, the importance of the data processed at and/or stored on the asset, for example, top secret, secret, confidential and the like, the cost of replacing the asset, the cost to the business if the asset is non-functional for a period of time and the like.

In some embodiments of the present invention, an asset index associated with the asset may dynamically change based on a current state of the asset. For example, an initial asset index may be provided for the asset, but, during operation, a change in context may be identified for the active asset. For example, a category of data being processed by the asset may change and/or an application executing on the asset may change. Accordingly, the asset index of the asset may automatically change based on the identified change in context of the asset.

For example, in grid computing, at any one point in time, a given web server could be serving business content. In other words, any one active, i.e., powered on and connected to a network, server in a group of active servers may be processing data, while the other active servers are idle. The server processing data has a higher impact on business continuity than the idle servers. Accordingly, the asset index for the server processing data may be changed to reflect the dynamic nature of the system.

Referring again to FIG. 2, each of the assets in the network environment 19, for example, client asset 14, router assets 31 and 33, switch asset 35 and client asset 17, may have an associated agent 26, 32, 34, 36, 25 that may be configured to detect security data associated with the asset, which may be used to calculate a threat index or the a vulnerability index associated with each of the assets or assign the asset index associated with each of the assets.

It will be understood that agents may be, for example, code running on an asset without departing from the scope of the present invention. It will be further understood that the network environment illustrated in FIG. 2 is provided for exemplary purposes only and that embodiments of the present invention are not limited to this configuration. Network environments according to some embodiments of the present invention may include any combination of endpoint nodes, terminals, routers, bridges, servers, printers, storage devices, I/O devices and the like without departing from the scope the present invention.

Figure 3:
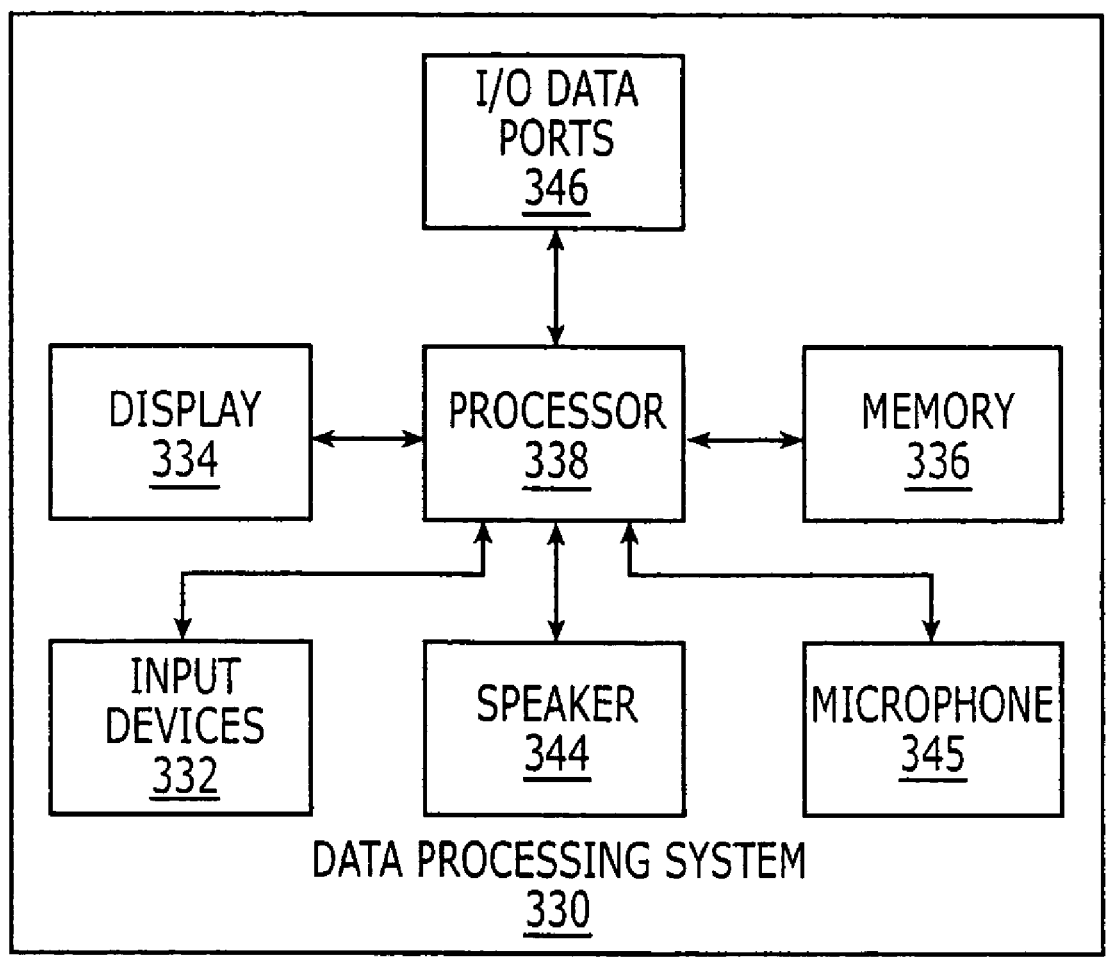
FIG. 3 is a block diagram of a data processing system according to some embodiments of the present invention.

FIG. 3 illustrates an exemplary embodiment of a data processing system 330 in accordance with embodiments of the present invention. The data processing system 330 typically includes input device(s) 332, such as a keyboard or keypad, a display 334 and a memory 336 that communicate with a processor 338. The data processing system 330 may further include a speaker 344, a microphone 345 and an I/O data port(s) 346 that also communicate with the processor 338. The I/O data port(s) 346 can be used to transfer information between the data processing system 330 and, for example, another computer system or a network 12, for example, using an Internet protocol (IP) connection. These components may be conventional components such as those used in many conventional data processing systems, which may be configured to operate as described herein.

Figure 4:
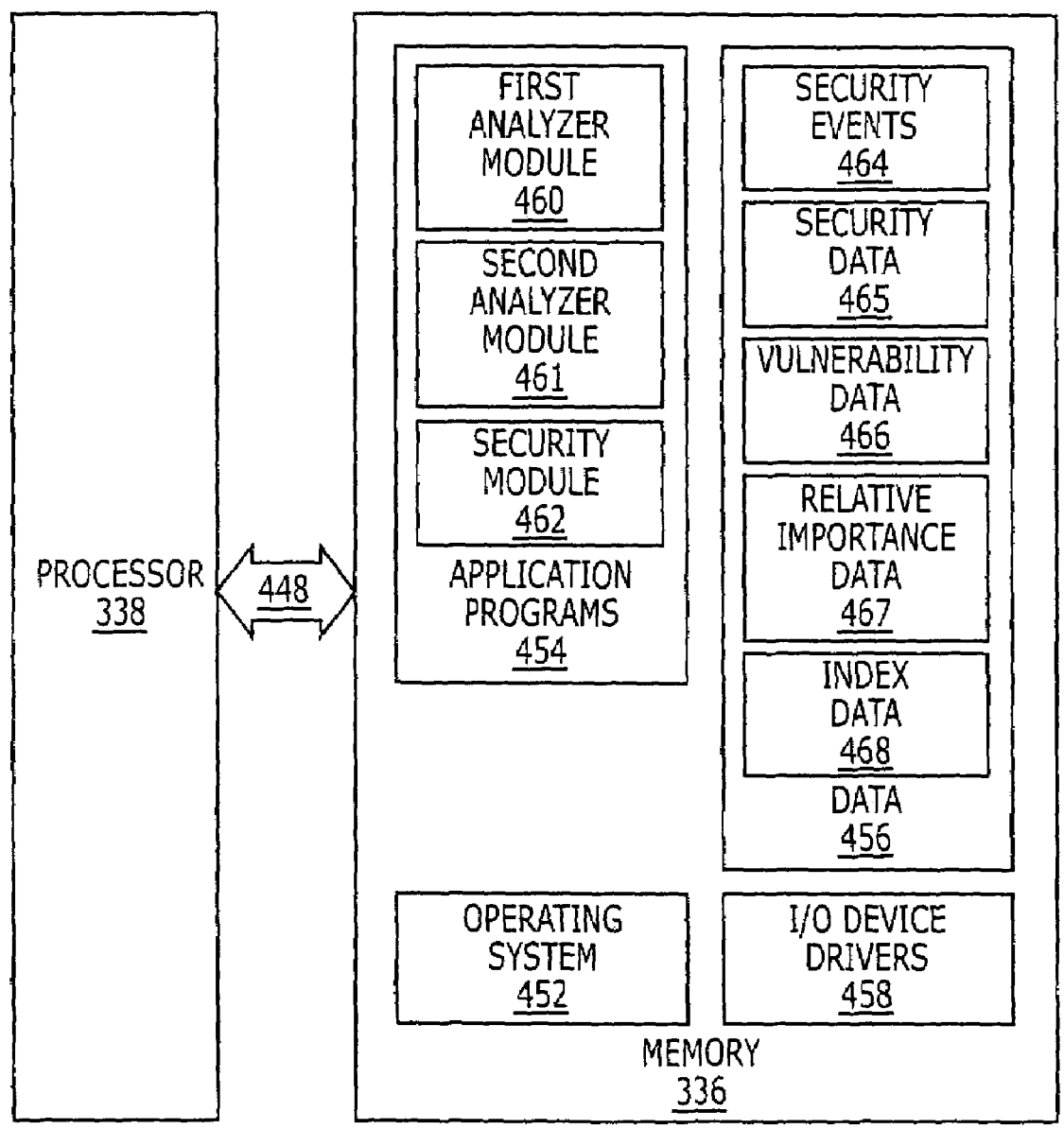
FIG. 4 is a more detailed block diagram of data processing systems according to some embodiments of the present invention.

FIG. 4 is a block diagram of embodiments of data processing systems that illustrate systems, methods, and computer program products in accordance with some embodiments of the present invention. The processor 338 communicates with the memory 336 via an address/data bus 448. The processor 338 can be any commercially available or custom microprocessor. The memory 336 is representative of the overall hierarchy of memory devices containing the software and data used to implement the functionality of the data processing system 330. The memory 336 can include, but is not limited to, the following types of devices: cache, ROM, PROM, EPROM, EEPROM, flash memory, SRAM, and DRAM.

As shown in FIG. 4, the memory 336 may include several categories of software and data used in the data processing system 330: the operating system 452; the application programs 454; the input/output (I/O) device drivers 458; and the data 456. As will be appreciated by those of skill in the art, the operating system 452 may be any operating system suitable for use with a data processing system, such as Solaris from Sun Microsystems, OS/2, AIX or System390 from International Business Machines Corporation, Armonk, N.Y., Windows95, Windows98, Windows NT, Windows ME, Windows. XP or Windows2000 from Microsoft Corporation, Redmond, Wash., Unix or Linux. The I/O device drivers 458 typically include software routines accessed through the operating system 452 by the application programs 454 to communicate with devices, such as the input devices 332, the display 334, the speaker 344, the microphone 345, the I/O data port(s) 346 and certain memory 336 components. The application programs 454 are illustrative of the programs that implement the various features of the data processing system 330 and preferably include at least one application that supports operations according to embodiments of the present invention. Finally, the data 456 represents the static and dynamic data used by the application programs 454, the operating system 452, the I/O device drivers 458, and other software programs that may reside in the memory 336.

Additional aspects of the data 356 in accordance with embodiments of the present invention are illustrated in FIG. 4. As illustrated in FIG. 4, the data 356 may include security event data 464, security data 465, vulnerability data 466 relative importance data 467 and index data 468. Although the data 356 is illustrated in FIG. 4 as separate blocks, embodiments of the present invention are not limited to this configuration. For example, two or more of the security event data 464, the security data 465, the vulnerability data 466, relative importance data 467 and index data 468 may be combined and stored together. Furthermore, there may be overlap between the different segments of data 356. For example, the security data 465 may include all of the contents of the security event data 464, the vulnerability data 466, relative importance data 467 and index data 468 without departing from the scope of the present invention.

As is further seen in FIG. 4, the application programs 454 may include a first analyzer module 460. The first analyzer module 460 may be configured to analyze security data 465 associated with an asset in the network environment collected over a first period of time to detect security events occurring at a rate above a reference rate. The application programs 454 may further include a second analyzer module 461 that is configured to analyze security data 465 associated with the asset collected over a second period of time, greater than the first period of time, to detect security events occurring at a rate below the reference rate. The application programs 454 may further include a security module 462 configured to generate a threat index based on the detected security events. The detected security events may be stored with the security event data 464 by the asset or the console node without departing from the scope of the present invention.

As used herein "occurring at a rate" means detectable based on a particular time period associated with security data used in establishing a baseline pattern, a deviation from which pattern may be characterized as a security event and/or the baseline pattern itself may be characterized as a security event. In other words, in some embodiments of the present invention a security event may be identified by a deviation from the established baseline pattern. For example, if a user of Terminal A logs in and out of the network at the same time every day, for example, 8 AM and 5 PM respectively, this may be indicated by the baseline pattern. Thus, when a user tries to log into Terminal A after 5 PM but before 8 AM, this deviation from the baseline pattern may be identified as a security event. Due to the relatively long length of time over which security data is collected to establish the baseline pattern used to identify the security event in this example, this security event may be characterized as occurring at a slow rate.

In further embodiments of the present invention, the baseline pattern itself may be identified as a security event. For example, a policy may be: two failed logins in a period of three minutes does not rise to the level of a possible security breach, i.e., this is in the range of a normal mistake. If the baseline pattern indicates that three failed logins occurred in three minutes, this may be identified as a security event. By way of further example, the baseline pattern may indicate three unsuccessful simultaneous login events on different machines using the same username and password and this pattern may also be identified as a security event. Due to the relatively short length of time over which data is collected to establish the baseline pattern used to identify the security events in these examples, these security events may be characterized as occurring at a fast rate.

In still further embodiments of the present invention, an actual instance of the security data may itself be characterized as a security event. For example, certain servers in a network environment may be used for highly confidential information and, therefore, be subjected to a higher level of security. Thus, any login attempts to these servers may be characterized as a security event. Due to the fact that the time period for detection of the security event in this example is essentially zero, i.e., the security data instance is itself a security event, the security event may be characterized as occurring at a rate equal to zero.

In some embodiments of the present invention, the threat index may be calculated based on two parameters, an event index and an alert index. An "event index" as used herein refers to a quantitative representation of slow attacks, i.e., a series of events that together may indicate a possible security breach, and may involve trending of security events over a historical period, for example, security events collected over a time period greater than six hours. In certain embodiments of the present invention, the event index may be allocated a value of from 1 to 4 or other discrete range. In some embodiments, the time period may be greater than or equal to 30 days. Establishing a historical trend of security events for an asset may establish baseline patterns for the asset, which may allow for early detection of security breaches or attacks based on a detected anomaly from the baseline patterns.

An "alert index," as used herein, refers to a quantitative representation of attacks, intrusions and/or security breach attempts associated with the asset collected over a recent short period of time, for example, no more than the most recent six hours. In certain embodiments of the present invention, the alert index may be allocated a value of from 1 to 4 or other discrete range. For example, the example discussed above where the security data instance itself is a security event (rate equal to zero) may be an example of a security event that may be quantified by an alert index.

The threat index may be calculated based on a combination of the event index and the alert index. In some embodiments of the present invention, the event index and the alert index may each be assigned a weighting. In these embodiments, the event index and the alert index may be combined based on the weighting. In certain embodiments of the present invention, the assigned weighting for the event index may be equal to the assigned weighting for the alert index. The threat index may be generated by calculating a sum of the event index and the alert index and dividing the sum by 2.

In some embodiments of the present invention, the event index may be calculated using the following equation:

$$\text{Event Index} = i\Sigma(2^{i}*(\text{number of events with } i))/(\text{total number of events}) \quad \text{(Equation 1)}$$

where i is a severity index associated with the asset, the number of events is the number of events associated with the asset having the severity index i during the second period of time and the total number of events is total number of events for the asset during the second period of time.

A "severity index" as used herein refers to the severity of the security event, for example, low, medium or high. For example, a failed login may have a very low severity, but an unauthorized access may have a very high severity. These severities may be given numerical representations, for example, a severity index of 0 may indicate a low severity, a severity index of 1 may indicate a medium severity and a severity index of 2 may indicate a high severity. Every security event has an associated severity index. The calculations of the event index, the alert index and the vulnerability index may be performed for one or more of the severity indexes. For example, a user may be curious as the vulnerability of the network environment with respect to vulnerabilities only having a low severity. Thus, the vulnerability calculation may only be performed using security events having low severity indexes.

For example, for a given asset, the data collected over the second period of time may indicate that there have been 8 events having a high severity index (2), 6 events having a medium severity index (1), and 20 events having a low severity index (0), totaling 34 events over the second period of time. Using Equation 1 above, the event index for this particular asset may be calculated as follows:

$$\text{Event Index} = ((2^2 * 8) + (2^1 * 6) + (2^0 * 20))/34$$
$$= 1.882353.$$

Similarly, in some embodiments of the present invention, the alert index may be calculated using the following equation:

$$\text{Alert Index} = i\Sigma(2^{i}*(\text{number of alerts}))/(\text{total number of alerts}) \quad \text{(Equation 2)}$$

where the number of alerts is the number of alerts for the asset having a severity index i during the first period of time and where the total number of alerts is the total number of alerts for all assets in the network during the first period of time.

As discussed above, the calculation of the alert index may be performed for one or more of the severity indexes. In certain embodiments of the present invention, the alert calculation may only be performed for those security events characterized by a high severity index, as a user may only need to be "alerted" with respect to high priority security events. It will be understood that embodiments of the present invention are not limited to this configuration. The second period of time may be about the last six hours before the alert index is calculated.

For example, for the given asset, the data collected over the first period of time may indicate that there were 5 security events having a high severity index (2) out of a total of 121 security events. Using Equation 2 above, the Alert index for this particular asset may be calculated as follows:

$$\text{Alert Index} = (2^2 * 5)/121$$
$$= .165289$$
$$= 1 \text{ (assuming a range of 1 to 4).}$$

Thus, as discussed above, the threat index may be generated by calculating a sum of the event index and the alert index and dividing the sum by 2. Using the event index and the alert index calculated above, the threat index in this example may be calculated as follows:

$$\text{Threat Index} = (\text{Event Index} + \text{Alert Index})/2$$
$$= (1.882353 + .165289)/2$$
$$= 1.023821.$$

Referring again to FIG. 4, the security module 462 may be further configured to generate a vulnerability index for the asset based on obtained vulnerability data 466. In some embodiments of the present invention, the vulnerability index may be calculated using the following equation:

$$\text{Vulnerability Index} = i\Sigma(2^{i}*(\text{number of failed checks}))/(\text{total number of checks}) \quad \text{(Equation 3)}$$

where i is a severity index associated with the asset, where the number of failed checks is the number of the failed checks associated with the asset having the severity index i during a third period of time and where the total number of checks is the total number of checks run on the asset during the third period of time.

The third period of time may be at least three full interrogations of the asset. For example, the network environment may have a list of policies and configurations. Periodically, a verification check of these policies and configurations may be performed for each asset in the network environment. Thus, if there is a list of twenty policies, an asset may be periodically asked if it complies with the twenty policies on the list. Similarly, the configuration of the asset may be checked and/or updated periodically. As used herein, "full interrogation" refers to a full check of the policies and configurations of the asset or a check of the policies and configurations of the asset that produces a sufficient number of failures such that the asset is assigned the worst possible vulnerability index, for example, a 4. Furthermore, each policy and configuration may have an associated severity characterized by a severity index, which may be used to determine the vulnerability index as illustrated in Equation 3. In some embodiments of the present invention, the interrogations of the assets in the network environment used to obtain the vulnerability data may be performed using Vulnerability Manager provided by NetIQ Corporation of San Jose, Calif., the assignee of the present application.

For example, for a given asset, the data collected over the third period of time may indicate that there have been 3 events having a high severity index (2), 8 events having a medium severity index (1), and 20 events having a low severity index (0), totaling 150 events over the second period of time. Using equation 3 above, the vulnerability index for this particular asset may be calculated as follows:

$$\text{Vulnerability Index} = ((2^2 * 3) + (2^1 * 8) + (2^0 * 20))/150$$

$$= .32$$

$$= 1 \text{ (assuming a range of 1 to 4)}.$$

The security module 462 may be further configured to assign an asset index to the asset based on obtained relative importance level data 467. In some embodiments of the present invention, the network environment may include a plurality of assets having an associated asset type, for example, a plurality of servers (i.e., type is server). Each of the plurality of assets may be assigned a similar asset index. An asset index of one of the plurality of assets may be changed based on the based on a difference between the category of data being processed by the active asset and the category of data being processed by the different active asset. It will be understood that as used herein an "active asset" refers to an asset that is not turned off and is connected to the network.

It will be understood that the values of the threat index, the vulnerability index and the asset index may be relative to other assets in the environment. Thus, the availability of these quantifications of security health of the network environment may allow efficient management of security breaches as the most insecure assets may be addressed first. Furthermore, due to the relative nature of the indexes described herein, the most secure asset in one environment may be the least secure asset in an unrelated environment.

The security module 462 may be further configured to generate a security index for an asset based on the generated threat index, the generated vulnerability index and the asset index. A "security index" as used herein is a quantitative indication of the security health of a network environment. A security index may be generated for a single asset in a network environment, for a group of assets in a network environment or all assets in the network environment. In some embodiments the security index of an asset may be allocated a value of between 1 and 64 of other discrete range. The higher the security index, for example, the worse the security posture of the asset in the network environment. Accordingly, assets having security indexes closest to 64 may be dealt with first to possibly avoid or reduce security breaches of the asset.

The security index may be calculated by generating a product of the generated threat index, the generated vulnerability index and the asset index. The security index, the threat index, the vulnerability index and the asset index may be stored in the index data 468. In some embodiments of the present invention, a security index may be generated for two or more assets in the network environment. Accordingly, an overall security index may be calculated for a group of assets in the network environment and/or all of the assets in the network environment by, for example, obtaining an average of the individual security indexes of the assets in the group or network environment, respectively. The owner or operator of the network environment may customize groups of assets or weightings within a group. The groups may be defined by, for example, geographical location of the assets, service, functionality and the like. For example, an overall security index may be generated for the assets located in Houston in a particular network environment, for the email servers or for the human resources assets.

For example, assuming the asset index for a given asset is assigned to be a 2, the security index for a given asset may be calculated by generating the product of generated threat index, the generated vulnerability index and the asset index. Using the values calculated and assigned above, the security index in this example may be calculated as follows:

$$\text{Security Index} = 1.02821 * 1 * 2$$

$$= 2.05642.$$

Assuming a range of 1 to 64 for the security index, 64 being the worst, this particular asset has a relatively good security posture in its environment.

It will be understood that although the overall security index is discussed above as being calculated from the indexes generated for the individual assets, embodiments of the present invention are not limited to this configuration. For example, the overall security index may be directly calculated using raw security data without departing from the scope of the present invention.

Figure 5:
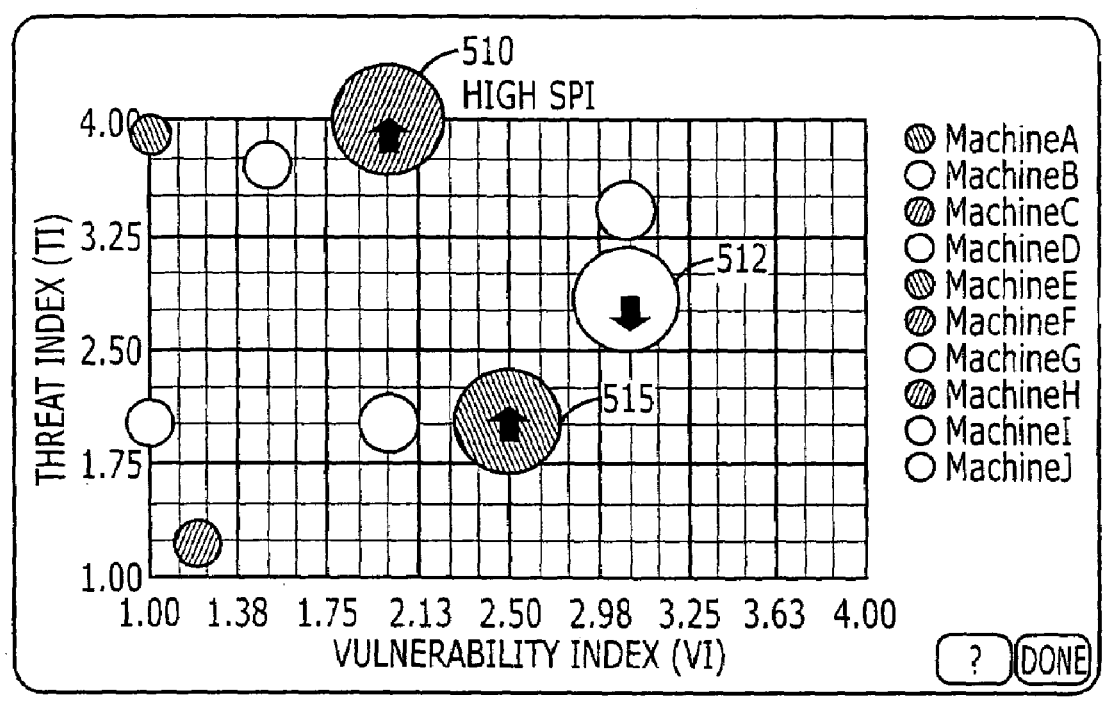
FIG. 5 is a schematic illustration of a graphical representation of security indexes according to some embodiments of the present invention.

In some embodiments of the present invention, a chart 500 that visually indicates the security index for ones of the plurality of assets may be generated. An exemplary chart 500 according to embodiments of the present invention is illustrated in FIG. 5. As illustrated therein, each of the security indexes associated with ones of the plurality of assets may have a different associated visual indication. For example, the bubbles on the chart 500 are different colors and different sizes. The colors differentiate between assets and the size of the bubble indicates the security index of ones of the plurality of assets relative to the security index of other ones of the plurality of assets, for example, the larger the bubble, the larger the security index.

As further illustrated in FIG. 5, arrows 510, 512 and 515 are provided to indicate a historical trend of the security index for the asset. An arrow 510, 515 directed towards a top portion of the chart may indicate that the security index of the asset has increased over time. Similarly, an arrow 512 directed towards a bottom portion of the chart 500 may indicate that the security index of the associated asset has decreased over time.

As further illustrated, the y-axis of the chart 500 corresponds to the threat index of the asset and the x-axis corresponds to the vulnerability index of the asset. The asset index is not depicted on the chart 500, as the chart is only two-dimensional. However, the asset index is taken into account in the calculation of the security index depicted on the chart 500.

It will be understood that the application programs 454 and the data 456 may be included in a console node, endpoint and/or other asset without departing from the scope of the present invention. Furthermore, it will be further understood that some of the application programs 454 may reside at the console node and some of the application programs 454 may reside at the asset. Similarly, some of the data 456, for example, the index data 468, may reside at the console node and some of the data 456, for example, the security event data 464, security data 465, vulnerability data 466 and the relative importance data 467, may reside at the asset, for example, an endpoint node, a router, a switch and the like.

Figure 6:
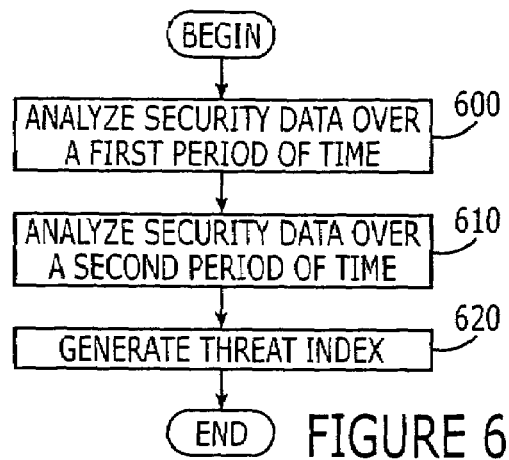
FIG. 6 is a flow chart illustrating operations for evaluating network security according to some embodiments of the present invention.

Referring now to the flow chart diagram of FIG. 6, operations for evaluating security of a network environment will be further described for various embodiments of the present invention. As illustrated in FIG. 6, operations begin at block 600 by analyzing security data associated with an asset in the network environment collected over a first period of time to detect security events occurring at a rate above a reference rate. Security data associated with the asset collected over a second period of time, greater than the first period of time, may also be analyzed to detect security events occurring at a rate below the reference rate (block 610). A threat index may be generated based on the detected security events (block 620). As discussed above, the threat index may be calculated by combining an event index and an alert index that in some embodiments of the present invention, are calculated using Equations 1 and 2, respectively.

Figure 7:
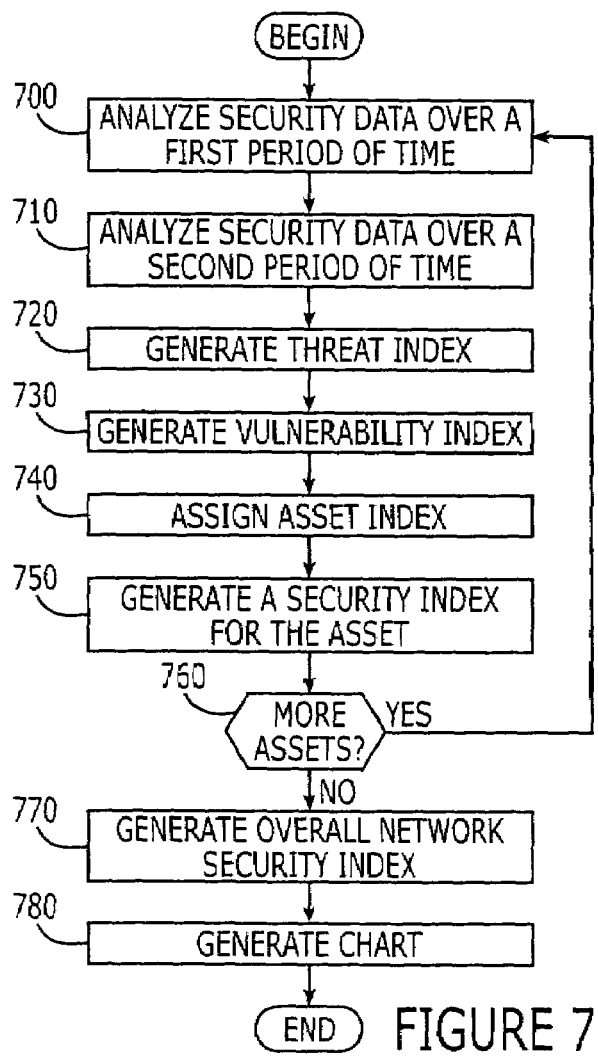
FIG. 7 is a flow chart illustrating operations for evaluating network security according to further embodiments of the present invention.

Referring now to FIG. 7, operations for evaluating security of a network environment according to further embodiments of the present invention will be discussed. As illustrated in FIG. 7, operations begin at block 700 by analyzing security data associated with an asset in the network environment collected over a first period of time to detect security events occurring at a rate above a reference rate. Security data associated with the asset collected over a second period of time, greater than the first period of time, may also be analyzed to detect security events occurring at a rate below the reference rate (block 710).

In some embodiments of the present invention, the first period of time may be a most recent period of time. A baseline pattern may be established based on the analyzed security data associated with the asset collected over the first period of time and/or the second period of time. In certain embodiments of the present invention, the detected security events may be detected based on security data that deviates from the baseline pattern. The baseline pattern may include a time sequence of events, for example, logs on at 8 AM and logs off at 5 PM, and the security data that deviates may include at least one event instance that is out of sequence with the time sequence of events, for example, logs on at 6 PM.

In still further embodiments of the present invention, the detected security events may be detected based on security data that corresponds to the baseline pattern. The baseline pattern may correspond to a defined pattern that indicates non-compliance with a policy indicating a possible security breach. For example, the defined pattern may be no wireless access to the network. A network that allows wireless access would be noncompliant with the policy. Finally, in certain embodiments of the present invention, the detected security events may be respectively detected based on a single instance of security data. In other words, the security data itself is the security event, for example, any login attempt at a particular server.

A threat index may be generated based on the detected security events (block 720). As discussed above, the threat index may be calculated by combining an event index and an alert index, which in some embodiments of the present invention are calculated using Equations 1 and 2, respectively. Once calculated, the event index and the alert index may be combined to provide the threat index. A weighting may be assigned to the event index and the alert index and the event index and the alert index may be combined based on the weighting. In some embodiments of the present invention, the assigned weighting for the event index is equal to the assigned weighting for the alert index. In these embodiments, the threat index may be calculated by calculating a sum of the event index and the alert index and dividing the sum by 2.

A vulnerability index may be generated for the asset based on obtained vulnerability data (block 730). In some embodiments of the present invention, the vulnerability index may be calculated using Equation 3 set out above. An asset index is assigned to the asset, for example, based on obtained relative importance level data (block 740). The asset index may be assigned by the owner or operator of the network environment based on the asset's relative importance with respect to other assets in the network environment. In some embodiments of the present invention, the asset index of the asset may be automatically changed based on the importance of the asset and/or the importance of the data flowing through the asset.

A security index may be generated for the asset based on the generated threat index, the generated vulnerability index and the asset index (block 750). It is determined if there are any more assets in the defined group or network environment for which a security index should be calculated (block 760). If it is determined that there are more assets, operations return to block 700 and repeat until it is determined that no more assets are present in the defined group or network environment (block 760).

If, on the other hand, it is determined that there are no more assets (block 760), operations continue to block 770 where an overall security index is generated for each of the plurality of assets in the defined group or network environment based on the security indexes of each of the individual assets in the defined group or network environment. In some embodiments of the present invention, the overall security index may be directly calculated using raw security data. The overall network security index may be calculated by obtaining an average of the generated security indexes for each of the plurality of assets in the defined group or network environment. A chart visually indicating the security index for ones of the plurality of assets may be generated (block 780). An exemplary chart according to some embodiments of the present invention is illustrated in FIG. 5.

Figure 8:
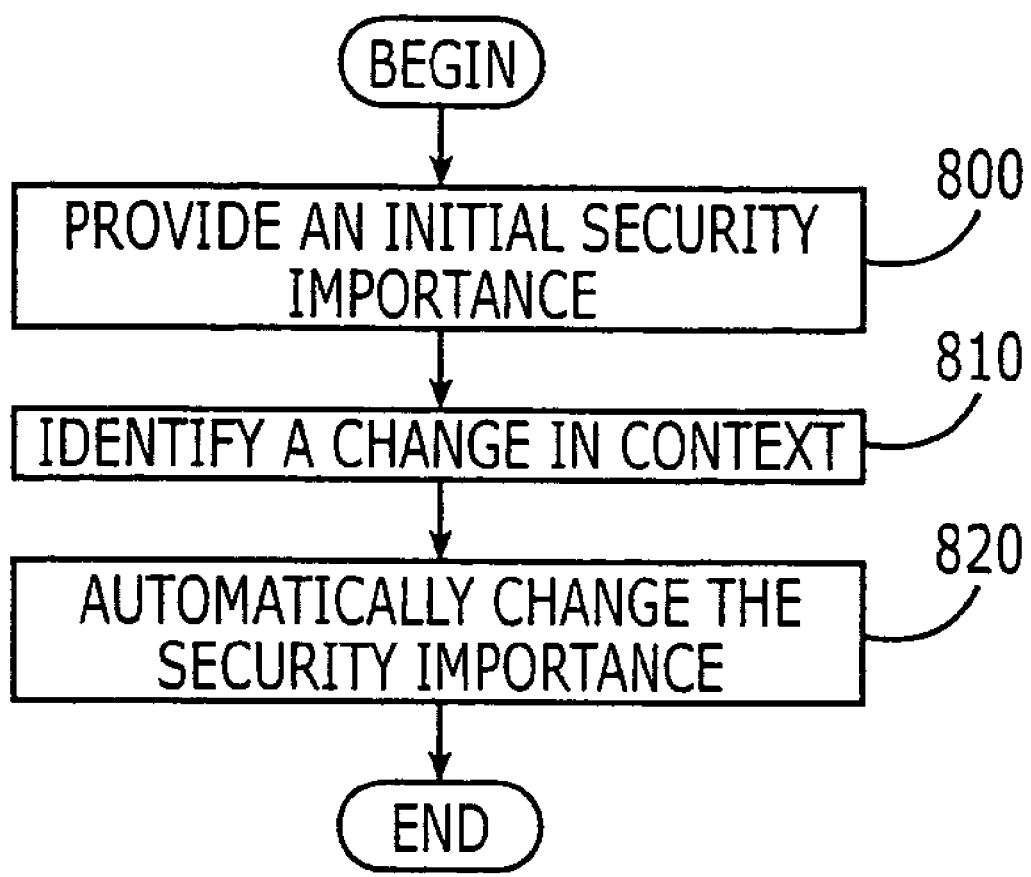
FIG. 8 is a flow chart illustrating operations for characterizing a security importance of an active asset in a network environment according to some embodiments of the present invention.

Referring now to FIG. 8, operations for characterizing a security importance, i.e., asset index, of an active asset in a network environment according to some embodiments of the present invention will be discussed. Operations begin at block 800 by providing an initial security importance for the active asset. As used herein "active asset" refers to an asset that is not in the off state and is connected to a network. An initial security importance may be assigned by the user or operator of the asset or a default initial security importance may be provided. A change in context may be identified for the active asset (block 810), for example, a change in the type of data being processed by the asset and/or a change in an application running on the asset. The security importance for the active asset may be automatically changed based on the identified change in context of the active asset (block 820).

In some embodiments of the present invention, the active asset may have an associated type and a category of data being processed by a different active asset having a same associated type may be determined. In these embodiments of the present invention, the change in context for the active asset may be identified based on a difference between the category of data being processed by the active asset and the category of data being processed by the different active asset.

As briefly discussed above with respect to FIGS. 1 through 8, security data may be obtained, stored and processed to provide a quantification of the security health of a network environment. The quantification may be an indicator of a threat to an asset, a vulnerability of the asset and/or the importance of the asset. These indicators may be combined to provide a single security index that indicates the security health of the asset. The security index may be generated for a single asset in a network environment, defined groups of assets in the network environment and/or all assets in the network environment. The security indexes for each of the assets in the group of assets in the network environment or the assets in the network environment may be combined to provide a single overall security index for the defined group of assets and/or the network environment.

It will be understood that the circuits and other means supported by each block and combinations of blocks can be implemented by special purpose hardware, software or firmware operating on special or general purpose data processors, or combinations thereof. It should also be noted that, in some alternative implementations, the operations noted in the blocks may occur out of the order noted in the figures. For example, two blocks shown in succession may, in fact, be executed substantially concurrently, or the blocks may sometimes be executed in the reverse order.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A computer implemented method for evaluating security of a network environment, the method comprising:
   analyzing security data associated with an asset in the network environment collected over a first period of time to detect security events occurring at a rate above a reference rate;
   analyzing security data associated with the asset collected over a second period of time, greater than the first period of time, to detect security events occurring at a rate below the reference rate; and
   generating a threat index based on the detected security events, wherein generating the threat index comprises:
   calculating an event index for the asset based on the security data associated with the asset collected over the second period of time;
   calculating an alert index for the asset based on the security data associated with the asset collected over the first period of time; and
   combining the event index and the alert index to provide the threat index; and
   wherein calculating the event index comprises calculating the event index using the following equation:

Event Index=$i \Sigma(2^{i}*$(number of events with $i$))/total number of events, wherein $i$ comprises a severity index associated with the asset, wherein the number of events comprises a number of events associated with the asset having the severity index $i$ during the second period of time and wherein the total number of events comprises a total number of events for the asset during the second period of time.

2. The method of claim 1, wherein the first period of time comprises a most recent period of time.

3. The method of claim 2, further comprising establishing a baseline pattern based on the analyzed security data associated with the asset collected over the first period of time and/or the second period of time.

4. The method of claim 3, wherein the detected security events are detected based on security data that deviates from the baseline pattern.

5. The method of claim 4, wherein the baseline pattern comprises a time sequence of events and wherein the security data that deviates comprises at least one event instance that is out of sequence with the time sequence of events.

6. The method of claim 3, wherein the detected security events are detected based on security data that corresponds to the baseline pattern.

7. The method of claim 6, wherein the baseline pattern corresponds to a defined pattern that indicates non-compliance with a policy indicating a possible security breach.

8. The method of claim 2, wherein the detected security events are respectively detected based on a single instance of security data.

9. The method of claim 1:
   wherein analyzing security data associated with an asset in the network environment collected over a first period of time is preceded by obtaining the security data associated with an asset in the network environment collected over the first period of time; and
   wherein analyzing security data associated with the asset collected over a second period of time is preceded by obtaining the security data associated with the asset collected over the second period of time.

10. The method of claim 9, wherein generating a threat index based on the detected security events is followed by providing a notification of the threat index.

11. The method of claim 10, wherein providing a notification of the threat index comprises generating a chart visually indicating the generated threat index.

12. The method of claim 1, further comprising assigning a weighting to the event index and the alert index, wherein combining the event index and the alert index comprises combining the event index and the alert index based on the weighting.

13. The method of claim 12 wherein the assigned weighting for the event index is equal to the assigned weighting for the alert index and wherein generating the threat index comprises calculating a sum of the event index and the alert index and dividing the sum by 2.

14. The method of claim 1, wherein the severity index i comprises a low severity, a medium severity and/or a high severity and wherein the second period of time comprises at least thirty days.

15. The method of claim 14, wherein calculating the alert index comprises calculating the alert index using the following equation:

Alert Index=$i\Sigma(2^{i}*$(number of alerts))/total number of alerts, wherein the number of alerts comprises the number of alerts for the asset having a severity index i during the first period of time and wherein the total number of alerts comprises a total number of alerts for all assets in the network during the first period of time.

16. The method of claim 15, wherein the severity index for the alert index calculation comprises a high severity and wherein the first period of time comprises no more than about the last six hours before the alert index is calculated.

17. A computer implemented method for evaluating security of a network environment, the method comprising:
analyzing security data associated with an asset in the network environment collected over a first period of time to detect security events occurring at a rate above a reference rate;
analyzing security data associated with the asset collected over a second period of time, greater than the first period of time, to detect security events occurring at a rate below the reference rate;
generating a threat index based on the detected security events;
generating a vulnerability index for the asset based on obtained vulnerability data;
assigning an asset index to the asset based on obtained relative importance level data; and
generating a security index for the asset based on the generated threat index, the generated vulnerability index and the assigned asset index.

18. The method of claim 17, wherein calculating the vulnerability index comprises calculating the vulnerability index using the following equation:

Vulnerability Index=$i\Sigma(2^{i}*$(number of failed checks))/ total number of checks wherein i comprises a severity index associated with the asset, wherein the number of failed checks comprises the number of the failed checks associated with the asset having the severity index i during a third period of time and wherein the total number of checks comprises a total number of checks run on the asset during the third period of time.

19. The method of claim 18, wherein the severity index i comprises a low severity, a medium severity and/or a high severity and wherein the third period of time comprises at least three full interrogations of the asset.

20. The method of claim 17, wherein generating the security index for the asset comprises calculating a product of the generated threat index, the generated vulnerability index and the assigned asset index.

21. The method of claim 17:
wherein generating a threat index comprises generating a threat index associated with each of a plurality of assets in the network environment;
wherein generating a vulnerability index comprises generating a vulnerability index associated with each of the plurality of assets in the network environment;
wherein assigning an asset index comprises assigning an asset index to each the plurality of assets in the network environment; and
wherein generating a security index comprises generating a security index for each of the plurality of assets in the network environment based on the threat index, the vulnerability index and the asset index associated with respective ones the plurality of assets.

22. The method of claim 21, further comprising calculating an overall network security index based on the generated security indexes for each of the plurality of assets.

23. The method of claim 22, wherein calculating the overall network security index comprises obtaining an average of the generated security indexes for each of the plurality of assets in the network environment.

24. The method of claim 21, further comprising generating a chart visually indicating the security index for ones of the plurality of assets.

25. The method of claim 24 wherein each of the security indexes associated with ones of the plurality of assets has a different associated visual indication and wherein a size of the associated visual indication indicates the security index of ones of the plurality of assets relative to the security index of other ones of the plurality of assets.

26. The method of claim 25, wherein generating the chart further comprises generating a chart including a visual indication of a historical trend of the security index for ones of the plurality of assets, the historical trend indicating an increase or decrease in the security index of an associated asset based on historical security data associated with ones of the plurality of assets.

27. The method of claim 17, wherein assigning an asset index further comprises:
providing an initial asset index for the asset;
identifying a change in context for the asset; and
automatically changing the asset index for the asset based on the identified change in context of the asset.

28. A computer system for evaluating security of a network environment, the system comprising:
a first analyzer module configured to analyze security data associated with an asset in the network environment collected over a first period of time to detect security events occurring at a rate above a reference rate;
a second analyzer module configured to analyze security data associated with the asset collected over a second period of time, greater than the first period of time, to detect security events occurring at a rate below the reference rate; and
a security module configured to generate a threat index based on the detected security events, wherein the security module is further configured to:
calculate an event index for the asset based on the security data associated with the asset collected over the second period of time;
calculate an alert index for the asset based on the security data associated with the asset collected over the first period of time; and
combine the event index and the alert index to provide the threat index; and
wherein the security module is further configured to calculate the event index using the following equation:

Event Index=$i\Sigma(2^{i}*$(number of alerts))/total number of events, wherein i comprises a severity index associated with the asset, wherein the number of events comprises a number of events associated with the asset having the severity index i during the second period of time and wherein the total number of events comprises a total number of events for the asset during the second period of time.

29. The system of claim 28, wherein the first period of time comprises a most recent period of time.

30. The system of claim 29, wherein the security module is further configured to establish a baseline pattern based on the analyzed security data associated with the asset collected over the first period of time and/or the second period of time.

31. The system of claim 30, wherein the security module is further configured to detect the detected security events based on security data that deviates from the baseline pattern.

32. The system of claim 31, wherein the baseline pattern comprises a time sequence of events and wherein the security data that deviates comprises at least one event instance that is out of sequence with the time sequence of events.

33. The system of claim 30, wherein the security module is further configured to detect the detected security events based on security data that corresponds to the baseline pattern.

34. The system of claim 33, wherein the baseline pattern corresponds to a defined pattern that indicates non-compliance with a policy indicating a possible security breach.

35. The system of claim 29, wherein the security module is further configured to respectively detect the detected security events based on a single instance of security data.

36. The system of claim 28, wherein the security module is further configured to assign a weight to the event index and the alert index and combine the event index and the alert index based on the weighting.

37. The system of claim 28, wherein the security module is further configured to calculate the alert index using the following equation:

Alert Index=$i\Sigma(2^{i}*$(number of alerts))/total number of alerts, wherein the number of alerts comprises the number of alerts for the asset having a severity index i during the first period of time and wherein the total number of alerts comprises a total number of alerts for all assets in the network during the first period of time.

38. A computer system for evaluating security of a network environment, the system comprising:
a first analyzer module configured to analyze security data associated with an asset in the network environment collected over a first period of time to detect security events occurring at a rate above a reference rate;
a second analyzer module configured to analyze security data associated with the asset collected over a second period of time, greater than the first period of time, to detect security events occurring at a rate below the reference rate; and
a security module configured to generate a threat index based on the detected security events, wherein the security module is further configured to:
generate a vulnerability index for the asset based on obtained vulnerability data;
assign an asset index to the asset based on obtained relative importance level data; and
generate a security index for the asset based on the generated threat index, the generated vulnerability index and the assigned asset index.

39. The system of claim 38, wherein the security module is further configured to calculate the vulnerability index using the following equation:

Vulnerability Index=$i\Sigma(2^{i}*$(number of failed checks))/total number of checks wherein i comprises a severity index associated with the asset, wherein the number of failed checks comprises the number of the failed checks associated with the asset having the severity index i during a third period of time and wherein the total number of checks comprises a total number of checks run on the asset during the third period of time.

40. The system of claim 38, wherein the security module is further configured to:
generate a threat index for each of a plurality of assets in the network environment;
generate a vulnerability index for each of the plurality of assets in the network environment;
assign an asset index to each of the plurality of assets in the network environment; and
generate a security index for each of the plurality of assets in the network environment based on the threat index, the vulnerability index and the asset index associated with respective ones the plurality of assets.

41. The system of claim 40, wherein the security module is further configured to calculate an overall network security index based on the generated security indexes for each of the plurality of assets.

42. The system of claim 38, wherein the security module is further configured to:
provide an initial asset index for the asset;
identify a change in context for the asset; and
automatically change the asset index for the asset based on the identified change in context of the asset.

43. A computer system for evaluating security of a network environment, the system comprising:
means for analyzing security data associated with an asset in the network environment collected over a first period of time to detect security events occurring at a rate above a reference rate;
means for analyzing security data associated with the asset collected over a second period of time, greater than the first period of time, to detect security events occurring at a rate below the reference rate; and
means for generating a threat index based on the detected security events, wherein the means for generating the threat index comprises:
means for calculating an event index for the asset based on the security data associated with the asset collected over the second period of time;
means for calculating an alert index for the asset based on the security data associated with the asset collected over the first period of time; and
means for combining the event index and the alert index to provide the threat index; and
wherein the means for calculating the event index comprises calculating the event index using the following equation:

Event Index=$i\Sigma(2^{i}*$(number of alerts))/total number of events, wherein i comprises a severity index associated with the asset, wherein the number of events comprises a number of events associated with the asset having the severity index i during the second period of time and wherein the total number of events comprises a total number of events for the asset during the second period of time.

44. A computer program product for evaluating security of a network environment, the computer program product comprising:

a computer readable storage medium having computer readable program code embodied in said medium, said computer readable program code comprising:

computer readable program code configured to analyze security data associated with an asset in the network environment collected over a first period of time to detect security events occurring at a rate above a reference rate;

computer readable program code configured to analyze security data associated with the asset collected over a second period of time, greater than the first period of time, to detect security events occurring at a rate below the reference rate; and computer readable program code configured to generate a threat index based on the detected security events, wherein the computer readable program code configured to generate the threat index further comprises:

computer readable program code configured to calculate an event index for the asset based on the security data associated with the asset collected over the second period of time;

computer readable program code configured to calculate an alert index for the asset based on the security data associated with the asset collected over the first period of time; and computer readable program code configured to combine the event index and the alert index to provide the threat index; and wherein the computer readable program code configured to calculate the event index is configured to calculate the event index using the following equation:

$$\text{Event Index} = i\Sigma(2^{i}*(\text{number of alerts}))/\text{total number of events},$$

wherein i comprises a severity index associated with the asset, wherein the number of events comprises a number of events associated with the asset having the severity index i during the second period of time and wherein the total number of events comprises a total number of events for the asset during the second period of time.

45. The computer program product of claim 44, wherein the first period of time comprises a most recent period of time.

46. The computer program product of claim 45, further comprising computer readable program code configured to establish a baseline pattern based on the analyzed security data associated with the asset collected over the first period of time and/or the second period of time.

47. The computer program product of claim 46, wherein the detected security events are detected based on security data that deviates from the baseline pattern.

48. The computer program product of claim 47, wherein the baseline pattern comprises a time sequence of events and wherein the security data that deviates comprises at least one event instance that is out of sequence with the time sequence of events.

49. The computer program product of claim 46, wherein the detected security events are detected based on security data that corresponds to the baseline pattern.

50. The computer program product of claim 49, wherein the baseline pattern corresponds to a defined pattern that indicates non-compliance with a policy indicating a possible security breach.

51. The method of claim 45, wherein the detected security events are respectively detected based on a single instance of security data.

52. The computer program product of claim 44, the computer readable program code configured to generate a threat index further comprises computer readable program code configured to assign a weight to the event index and the alert index and combine the event index and the alert index based on the weighting.

53. The computer program product of claim 44, wherein the computer readable program code configured to calculate the alert index is configured to calculate the alert index using the following equation:

$$\text{Alert Index} = i\Sigma(2^{i}*(\text{number of alerts}))/\text{total number of alerts},$$

wherein the number of alerts comprises the number of alerts for the asset having a severity index i during the first period of time and wherein the total number of alerts comprises a total number of alerts for all assets in the network during the first period of time.

54. A computer program product for evaluating security of a network environment, the computer program product comprising:

a computer readable storage medium having computer readable program code embodied in said medium, said computer readable program code comprising:

computer readable program code configured to analyze security data associated with an asset in the network environment collected over a first period of time to detect security events occurring at a rate above a reference rate;

computer readable program code configured to analyze security data associated with the asset collected over a second period of time, greater than the first period of time, to detect security events occurring at a rate below the reference rate;

computer readable program code configured to generate a threat index based on the detected security events;

computer readable program code configured to generate a vulnerability index for the asset based on obtained vulnerability data;

computer readable program code configured to assign an asset index to the asset based on obtained relative importance level data; and computer readable program code configured to generate a security index for the asset based on the generated threat index, the generated vulnerability index and the assigned asset index.

55. The computer program product of claim 54, wherein the computer readable program code configured to calculate the vulnerability index is configured to calculate the vulnerability index using the following equation:

$$\text{Vulnerability Index} = i\Sigma(2^{i}*(\text{number of failed checks}))/\text{total number of checks}$$

wherein i comprises a severity index associated with the asset, wherein the number of failed checks comprises the number of the failed checks associated with the asset having the severity index i during a third period of time and wherein the total number of checks comprises a total number of checks run on the asset during the third period of time.

56. The computer program product of claim 54 further comprising:

computer readable program code configured to generate a threat index associated each of a plurality of assets in the network environment;

computer readable program code configured to generate a vulnerability index associated each of the plurality of assets in the network environment;

computer readable program code configured to assign an asset index associated with each of the plurality of assets in the network environment; and computer readable program code configured to generate a security index for each of the plurality of assets in the network environment based on the threat index, the vulnerability index and the asset index associated with respective ones the plurality of assets.

57. The computer program product of claim 56 further comprising computer readable program code configured to calculate an overall network security index based on the generated security indexes for each of the plurality of assets.

58. The computer program product of claim 54, wherein the computer readable program code configured to assign an asset index further comprises:

computer readable program code configured to provide an initial asset index for the asset;

computer readable program code configured to identify a change in context for the asset; and computer readable program code configured to automatically change the asset index or the asset based on the identified change in context of the asset.

59. A computer system for evaluating security of a network environment, the system comprising:

means for analyzing security data associated with an asset in the network environment collected over a first period of time to detect security events occurring at a rate above a reference rate;

means for analyzing security data associated with the asset collected over a second period of time, greater than the first period of time, to detect security events occurring at a rate below the reference rate;

means for generating a threat index based on the detected security events;

means for generating a vulnerability index for the asset based on obtained vulnerability data;

means for assigning an asset index to the asset based on obtained relative importance level data; and means for generating a security index for the asset based on the generated threat index, the generated vulnerability index and the assigned asset index.

* * * * *

UNITED STATES PATENT AND TRADEMARK OFFICE
CERTIFICATE OF CORRECTION

PATENT NO. : 7,523,504 B2
APPLICATION NO. : 10/909655
DATED : April 21, 2009
INVENTOR(S) : Shah Page 1 of 1

It is certified that error appears in the above-identified patent and that said Letters Patent is hereby corrected as shown below:

Please replace (Column 6, Line 42 - 60) with the following:
-- As will be appreciated by one of skill in the art, the present invention may be embodied as a mobile terminal, method or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including either computer readable storage mediums, such as hard disks, CD-ROMs, optical storage devices or magnetic storage devices, or a transmission media, such as those supporting the Internet or an intranet. --

Column 20, Claim 28, Line 63:
Please correct "(number of alerts)" to read -- (number of events with i) --

Column 22, Claim 43, Line 57:
Please correct "(number of alerts)" to read -- (number of events with i) --

Column 23, Claim 44, Line 33:
Please correct "(number of alerts)" to read -- (number of events with i) --

Column 25, Claim 58, Line 21: Please correct "or" to read -- for --

Signed and Sealed this

Twenty-third Day of June, 2009

JOHN DOLL
*Acting Director of the United States Patent and Trademark Office*